Aug. 7, 1951 K. W. THALHAMMER 2,563,198

REEL CONSTRUCTION

Filed March 7, 1950

KARL WOLFGANG THALHAMMER
INVENTOR.

BY [signature]

ATTORNEY.

Patented Aug. 7, 1951

2,563,198

UNITED STATES PATENT OFFICE 2,563,198

REEL CONSTRUCTION

Karl Wolfgang Thalhammer, Sunland, Calif.

Application March 7, 1950, Serial No. 148,153

6 Claims. (Cl. 242—70)

This invention relates to an improved reel construction and more particularly to a combined reel and container for use in winding, unwinding, and storing of strip material, such as motion picture strip film.

Prior reel construction for strip film generally comprised two perforated circular discs, irremovably attached to a central axial hub which spaced the two discs and around which the strip film is wound. Attaching an end of a film to the central hub of prior reels is awkward and inconvenient because of necessity of introduction of an end of the film between the fixed discs and manipulation of the end of the film to attach it to the central hub in a restricted space where movement of fingers is extremely limited. A similar difficulty is encountered when the end of the film is detached from the hub, the restricted space causing manipulation of fingers very awkward and difficult in order to free the end of the film.

When winding a strip film on a prior reel construction, it often becomes desirable to manually brake rotation of the reel to prevent backlash and to control tension in the strip film as winding speeds are changed. Usually, braking is performed by placing the thumb on the circumferential edge of one of the discs. Even though the edge of such a disc may be beaded, because of its narrowness with respect to the thumb, wearing action on a thumb is pronounced and the length of time that a thumb can be held against the edge is limited.

Film wound on prior reels is usually placed in separate containers of slightly larger size for storage. The use of a separate container necessitated marking for identification not only the reel but also the container in which the reel is to be placed in order to quickly and conveniently identify the film when in storage. Since film is often used in a dim or dark light and in the presence of several other films and their containers, misplacement of a film on a reel into a container bearing different identification often results in a particular film being lost and unavailable for a considerable time.

An object of this invention is to design and provide an improved reel construction arranged to facilitate winding of a strip film by providing a convenient braking surface and adapted to provide a cover for the film so that the reel construction may be utilized both as a reel and a storage container.

Another object of this invention is to design and provide a combined reel and container construction, wherein one of the side members of the reel is removable and reversible to provide a container for film wound thereon.

Still another object of this invention is to design and provide a combined reel and container for film, wherein coupling means are provided for holding the side members of the reel in properly spaced assembled relationship.

A further object of this invention is to design and provide a combined reel and container construction for film, wherein one of the side members is provided with means affording a convenient wide surface for application of braking pressures by a thumb.

A still further object of this invention is to design and provide a reel construction, wherein one of the side members is releasably locked to coupling means provided on the other side member.

The invention contemplates a reel construction provided with improved means for introducing and securing an end of a film to the reel prior to winding when one of the side members is removed.

The invention also contemplates a combined reel and container construction of light weight, capable of being sealed against moisture, and occupying a minimum space for storage.

A further object of this invention is to provide a reel for strip film, wherein means are provided for limiting the amount of film insertable into the film end holding means.

Generally speaking, the combined reel and container for use with strip motion picture film comprises a flat side member having a centrally disposed hollow cylindrical reel face member extending to one side thereof and a removable and reversible second side member having a cylindrical cover flange and provided with locking means cooperable with coupling means on the first side member in order to releasably lock the second side member in film winding position or in container storage position, the cover flange being outwardly directed in film winding position and inwardly directed and seated against the first side member when in container storage position.

Other objects and advantages of this invention will be readily apparent from the following descriptions of the drawings.

Figure 1:
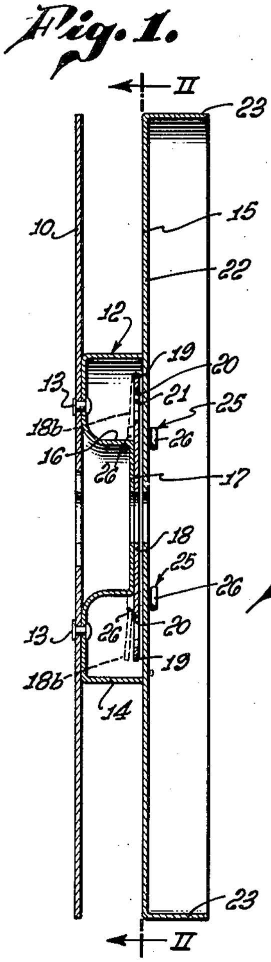
Fig. 1 is a sectional view of a combined reel and construction embodying this invention, the reel being disposed in film winding position, the section being taken in a transverse diametrical plane.

The reel construction in Fig. 1 is illustrated in film winding position and comprises a flat circular axially ported first side member 10 of sufficient diameter to carry a selected length of film to be wound on the reel. The side member 10 is illustrated as being provided with enlarged spaced openings 11 for observation of progress of the film when being wound or unwound. It is understood, of course, that this invention contemplates that such openings may be entirely omitted in order to provide an imperforate side member 10, or preferably, a radially arranged narrow slot may be provided for observational purposes, the slot being adapted to be readily covered and sealed with a suitable adhesive material or tape to prevent entrance of moisture into the reel when used as a container for storage.

Centrally disposed on side member 10 is a hollow cylindrical reel face member 12 secured to one face of the side member by any suitable means, such as spaced rivets 13. The reel face member 12 extends laterally outwardly from side member 10 and includes a cylindrical outer wall 14 having a width just slightly greater than the width of film which is to be wound on the reel, said wall 14 serving to maintain a second side member 15 of the reel in proper spaced relationship. The reel face member 12 is provided with concentric inner central boss 16 having an axially ported circular flat face 17 lying in a plane spaced inwardly from the plane defined by the circumferential outer edge of the cylindrical wall 12.

Figure 2:
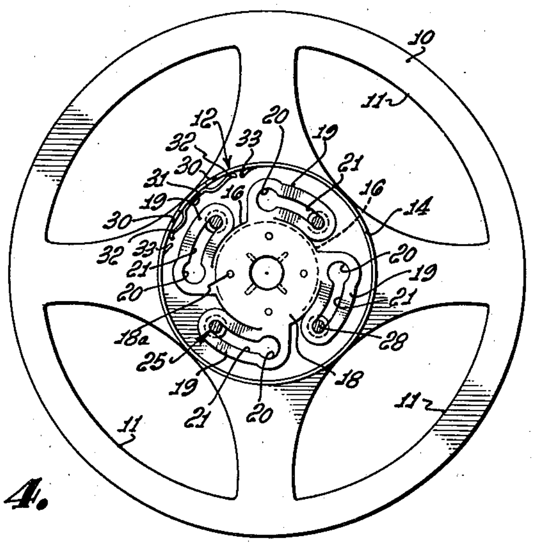
Fig. 2 is a side view of one side member of the reel shown in Fig. 1, the view being taken from the plane indicated by the line II—II of Fig. 1.

Secured to the face 17 of boss 16 is a resilient coupling means for holding the side members 10 and 15 in assembled relation. The coupling means include a generally circular axially ported member 18 secured to face 17 by any suitable means, such as rivets 18*a*, the diameter of the circular member 18 being slightly greater than the diameter of face 17. Integrally formed on the circumferential edge of the circular member 18 are plurality of pairs of diametrically opposed radially outwardly and circumferentially extending, resilient tabs 19. As best seen in Fig. 2 the tabs are integrally joined with the circular member 18 only at one end of the tab, the remaining portion of the tab being normally biased inwardly and out of the plane defined by the circular member 18 as indicated by dotted lines 18*b* (Fig. 1). Preferably the member 18 and tabs 19 are formed of a thin resilient metallic material, such as Phosphor bronze. Each tab 19 is provided with an enlarged port 20 adjacent the end joined to member 18 and lying in virtually the same plane as member 18 and with an arcuate slot 21 extending to the opposite inwardly biased end portion of the tab.

Figure 6:
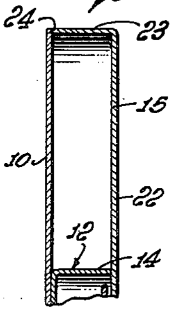
Fig. 6 is a fragmentary sectional view of the reel construction shown in Fig. 1, wherein the flanged side member is reversed in position to provide a container for the film.

The second side member 15, which is removable and reversible with respect to the first side member 10, may comprise a circular axially ported flat imperforate wall 22 having a cylindrical cover flange 23. The inner diameter of the second side member 15 is slightly less than the diameter of side member 10 so that when the reel is used as a container and the side member 15 is disposed as illustrated in Fig. 6, the circumferential edge of the cover flange 23 will seat against circumferential edge margins of the side member 10 as at 24.

The second side member 15 carries adjacent its axial port locking means for cooperative engagement with the coupling means carried by the reel face member 12.

Figure 4:
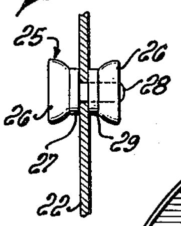
Fig. 4 is a fragmentary enlarged view of a locking means employed in the reel shown in Fig. 1, the section being taken in the plane indicated by the line IV—IV of Fig. 3.
Figure 3:
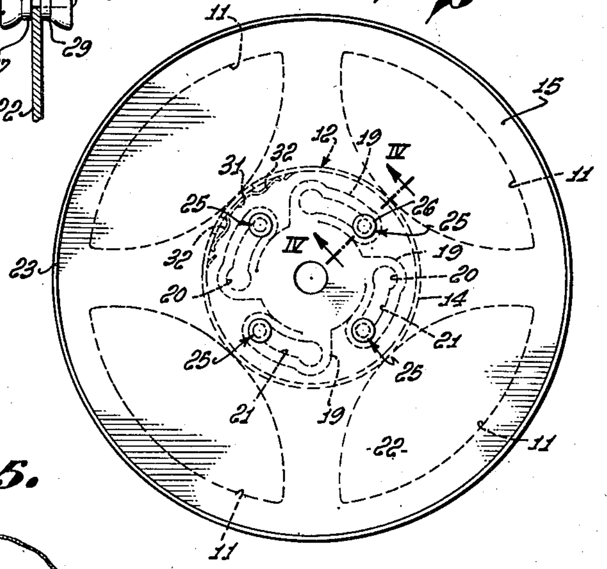
Fig. 3 is a side view of the reel construction shown in Fig. 1, and taken from the right thereof.

The locking means include diametrically opposed pairs of buttons 25 each having enlarged inwardly tapered heads 26 on opposite sides of wall 22 adapted to be inserted into the enlarged ports 20 in the tabs 19. As shown in Fig. 4, each button 25 may comprise a male member having an enlarged shoulder 27 affording a seat against one side of wall 22 and a shank 28 adapted to extend through wall 22 and through a female element including an enlarged head 26 and an enlarged shoulder 29 seated against the other side of wall 22. The shoulders also serve to space the heads 26 from wall 22 so that the heads 26 may extend into ports 20.

It will be readily apparent that side member 15 is releasably locked in assembled relationship with side member 10 in either film winding position or container covering position by insertion of heads 26 on one side of side member 15 into enlarged ports 20 and then turning side member 15 so that shoulders 27 (or 29) are grasped by the arcuate slots 21. Since the resilient tabs 19 are normally biased inwardly, rotation of side member 15 will draw or pull member 15 toward side member 10 until the outer surface of wall 22 is seated against the circumferential edge of wall 14 of the reel face member 12. It should be noted that the inward spacing of face 17 from the plane defined by the circumferential edge of wall 14 affords sufficient clearance for mounting of coupling member 18 and for drawing of the wall 22 into tight seating engagement with the circumferential edge of wall 14. The tapering surface on each head 26 facilitates entrance of the head into the arcuate slot 21 by guiding the entrance edges of the slot into grasping engagement with the adjacent shoulder of the button.

A reel construction is thus provided wherein side member 15 is readily removable and reversible to afford either a relatively wide braking surface for a thumb when the reel is assembled in winding position or to afford a cover for the film when the film has been completely wound.

Figure 5:
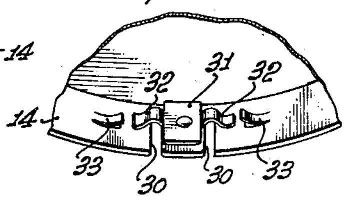
Fig. 5 is a fragmentary enlarged perspective view of a portion of the circumferential edge of the reel face member employed in Fig. 1 and showing an improved holding means for attaching an end of a film to the reel.

Means for connecting and holding an end of a film to be wound on the reel is best shown in Figs. 2 and 5. The cylindrical wall 14 of the reel face member 12 is provided with two spaced slots 30 having open ends at the circumferential edge of wall 14 for facilitating lateral insertion of an end of the film into one of the slots when member 15 is detached. Between slots 30 is provided a clip 31 having oppositely extending resilient fingers 32, each finger extending across a slot 30 and having an arcuate end presenting a convex surface normally biased against the inner surface of wall 14. A stop tab 33 is formed in wall 14 spaced from and in alignment with each finger 32 by punching a rectangular portion of the metal inwardly.

When side member 15 is removed from assembled relationship with side member 10, an end of a film to be wound may be laterally inserted through the open end of a slot 30 and then moved longitudinally beneath the resilient finger 32 until the end edge of the film abuts against the stop tab 33. The resilient finger 32 exerts sufficient pressure contact against the end of the film to hold the film during a winding operation. The clip and double slot arrangement permits attachment of an end of a film to the reel for winding in either clockwise or counterclockwise direction.

The advantages of the combined reel and container described above are readily apparent. As noted immediately above, the end of the film is conveniently and easily attached to the reel when the side member 15 is removed without awkward and cumbersome manipulation of fingers in a restricted space. The end of the film is readily attached and adjusted in proper position by the provision of stop tabs 33 and resilient fingers 32.

After the end of the film is attached to the reel, the side member 15 is conveniently snapped into assembled relationship with the side member 10 in film winding position by insertion of heads 26 into the enlarged ports 20, and then quickly securing the side member 15 by turning clockwise through a small arc, the resilient tabs 19 automatically drawing the side member 15 into tight engagement with the edge of wall 14 in proper spaced relationship. Any possible wobbling of the attached side member 15 is eliminated by the circular seating engagement of the side member with the wall 14 and by cooperative engagement of the plurality of pairs of diametrically opposed resilient tabs carried by member 10 and the locking buttons carried by member 15. In winding position the cover flange affords a convenient wide braking surface for manual control of tension of the film being wound.

When a film has been wound on the reel, side member 15 is easily removable by simply turning counterclockwise through a small arc to disengage the buttons 25 with the resilient tabs 19. Side member 15 may then be reversed in position and snapped into assembled relationship with side member 10 so that the cover flange seats against the edge margins of side member 10 and the film carried by the reel is completely enclosed. Here again, the cooperative engagement of the coupling means on member 10 and the locking means on member 15 hold the reel in tight assembled relationship and in such a manner that the reel may be conveniently sealed against moisture by securing a piece of adhesive tape over the seating engagement of the cover flange with the side member 10.

Since the film carrying reel is capable of being used as a storage container for the film, as described above, misplacement of film into a different storage container marked for a different film is impossible.

It will be readily understood by those skilled in the art that various changes and modifications may be made in the combined reel and container construction illustrated including the coupling means, and all such modifications and changes coming within the scope of the appended claims are embraced thereby.

I claim:

1. A combined reel and container for strip motion picture film and the like, comprising: a substantially flat, circular, axially ported, first side member; a centrally disposed, hollow cylindrical reel-face member carried by the first side member and extending to one side thereof; coupling means carried by and within the hollow reel-face member; a second circular, axially ported side member, said second side member having a cylindrical cover flange carried by the outer margin thereof; and locking means carried by the second side member and arranged for cooperative engagement with the coupling means when the cover flange extends toward the first side member and for cooperative engagement with the coupling means when the cover flange extends away from the first side member.

2. A reel of the character stated in claim 1, wherein the coupling means is resilient and is normally spaced from the plane of the outer circumferential margin of the reel-face.

3. A reel of the character stated in claim 1, wherein the coupling means comprises a pair of resilient tabs, each having an enlarged port, arranged to receive a locking means, and an arcuate slot arranged to grasp a locking means.

4. A reel of the character stated in claim 1, wherein the diameter of the first side member is slightly greater than the diameter of the second side member, whereby the margin of the cover flange carried by the second side member will abut the first side member when the locking means are in engagement with the coupling means with the cover flange extending toward the first side member.

5. In a combined reel and container for strip motion picture film and the like, the provision of: a circular axially ported first side member; a hub member coaxially carried by the first side member and extending to one side thereof; a second axially ported circular side member having a cylindrical cover flange on the outer margin thereof; and means on said hub member cooperative with means on said second member for selectively coupling said second side member to said hub member when the cover flange extends toward said first side member to provide a reel cover and when the cover flange extends away from said first side member to provide a braking surface.

6. In a combined reel and container for strip motion picture film and the like, the provision of: an axially ported first side member; a coaxially disposed hollow hub member carried by the first side member and extending to one side thereof; a second axially ported side member having a cover flange on the outer periphery thereof cooperative with the first side member to provide a reel cover in one position and operable in another position to provide a reel braking surface spaced from said first side member; and cooperable means on said hub member and said second side member for selectively coupling said second side member in said positions.

KARL WOLFGANG THALHAMMER.

REFERENCES CITED

The following references are of record in the file of this patent:

UNITED STATES PATENTS

| Number | Name | Date |
|---|---|---|
| 913,328 | Uebelmesser | Feb. 23, 1909 |
| 2,189,547 | Fischer | Feb. 6, 1940 |
| 2,191,489 | McQuiston | Feb. 27, 1940 |
| 2,358,504 | Goldberg | Sept. 19, 1944 |
| 2,467,607 | Bates | Apr. 19, 1949 |
| 2,494,612 | Goldberg et al. | Jan. 17, 1950 |